No. 637,190. Patented Nov. 14, 1899.
E. E. WHIPPLE, Dec'd.
H. M. WHIPPLE, Administratrix.
AGRICULTURAL IMPLEMENT.
(Application filed Aug. 23, 1898.)
(No Model.) 2 Sheets—Sheet 1.
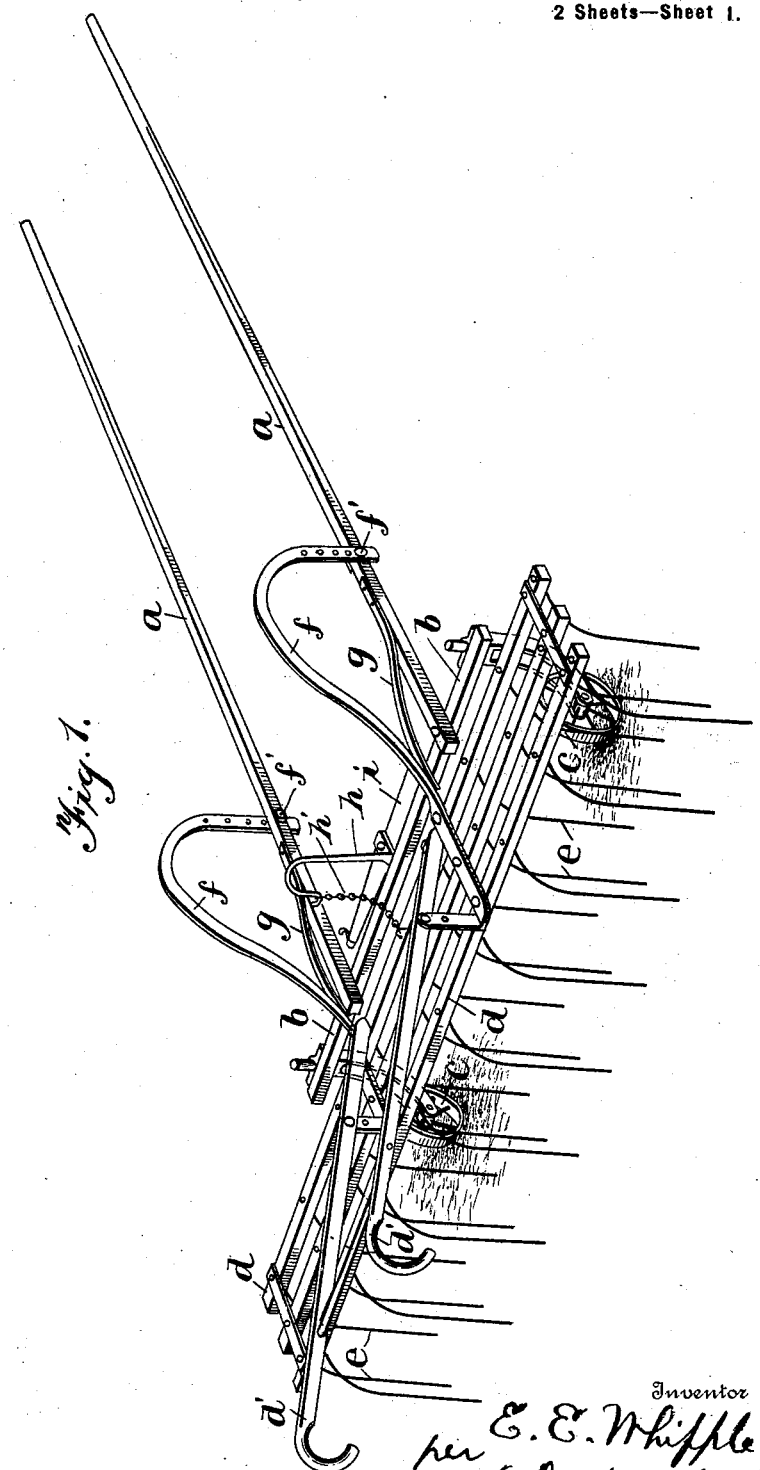

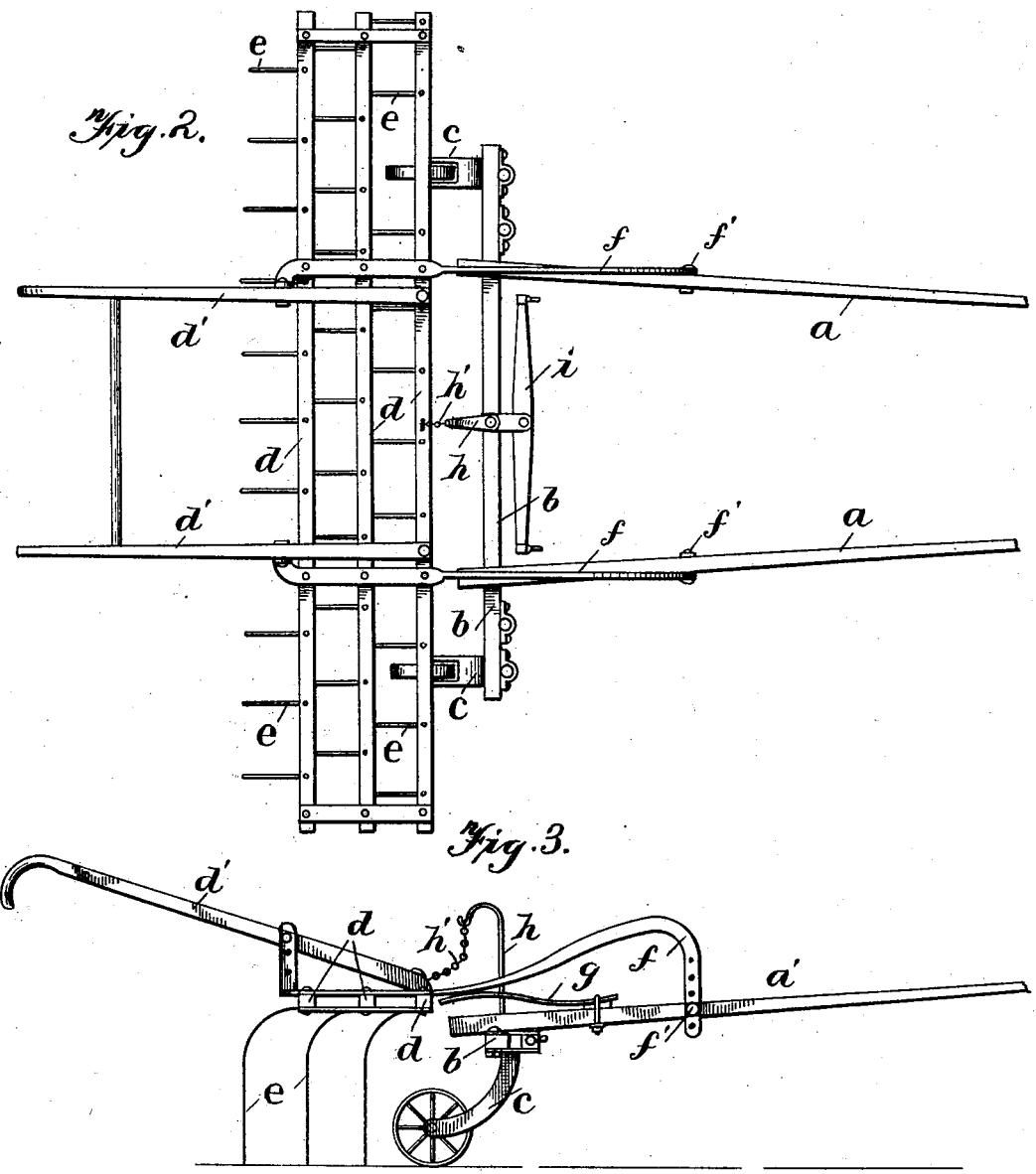

UNITED STATES PATENT OFFICE.

EFFINGER E. WHIPPLE, OF UTICA, NEW YORK; HANNAH M. WHIPPLE ADMINISTRATRIX OF SAID EFFINGER E. WHIPPLE, DECEASED.

AGRICULTURAL IMPLEMENT.

SPECIFICATION forming part of Letters Patent No. 637,190, dated November 14, 1899.

Application filed August 23, 1898. Serial No. 689,300. (No model.)

*To all whom it may concern:*

Be it known that I, EFFINGER E. WHIPPLE, a citizen of the United States, residing at Utica, in the county of Oneida and State of New York, have invented certain new and useful Improvements in Agricultural Implements; and I do hereby declare the following to be a full, clear, and exact description of the invention, such as will enable others skilled in the art to which it appertains to make and use the same.

This invention relates to certain improvements in agricultural implements, and more particularly to improvements in that class of implements generally termed "weeders" or the like; and the objects and nature of the invention will fully appear, broadly and as to specific details, in the following description, in connection with the constructions shown in the accompanying drawings of examples within the scope of my invention.

The invention consists in certain novel features in construction and in details and in combinations and in arrangements of parts, as more fully and particularly set forth and pointed out hereinafter.

Referring to the accompanying drawings, which merely illustrate examples out of various constructions within the spirit and scope of my invention to enable those skilled in the art to understand my invention, both broadly and specifically, Figure 1 is a perspective view of a form of my invention, the parts being shown in working position with the teeth in operative adjustment with respect to the soil. Fig. 2 is a top plan view. Fig. 3 is an end elevation.

In carrying out my invention a suitable draft or what might be termed a "main" or "supporting" frame is provided, which is generally and preferably arranged centrally of the implement and provided with suitable draft devices, such as forwardly-extending preferably rigid poles or shafts, although the invention is not limited to any particular construction of draft attachment or supporting device. I show the implement provided with forwardly-extending shafts or thills $a$ $a$, with their rear ends separated and secured rigidly to the axle or cross beam or frame $b$, arranged horizontally or transversely and preferably projecting laterally beyond and extending between the thills. Said draft or supporting frame is provided with suitable ground-supports carrying the same at the proper elevated plane above the ground. Depending shoes or wheeled devices can be employed for this purpose, although as an example I show caster-wheels $c$ $c$, the frames of which are allowed free lateral play and at their upper ends pivotally joined (to permit such play) to the axle or cross-frame $b$. The caster-wheel frames preferably extend downwardly and rearwardly from said axle, with the wheels mounted in the rear ends of said frames, and the caster-wheel frames are usually, although not necessarily, arranged at the end portions of the axle or frame $b$. The forward movement of the implement can thus be easily directed to the right or left by the draft animal or animals, as the caster-wheels swing laterally and follow the direction of forward movement of the draft-frame. However, I do not wish to limit myself to the employment of laterally-movable ground-supports, as other supporting means for the draft-frame might be employed.

The tooth or cultivating-implement carrying frame is here shown as a long horizontal transversely-arranged frame made up of a number of tooth-bars $d$. One or more tooth-bars or other means for carrying the teeth can be employed, although in the drawings I show three parallel tooth-bars $d$, secured rigidly together and the desired distance apart and arranged one behind the other and having any suitable style of teeth or other cultivating implements or tools $e$ secured thereto in the manner and arranged as desired for the peculiar work to be performed by the device. The tooth-frame is shown provided with the rearwardly-extending handles $d'$ for the purpose of holding the teeth down to work or for raising the tooth-frame and for guiding the implement. These handles are usually employed where a riding attachment is not provided.

The tooth-frame is preferably arranged in rear of the draft-frame and its axle $b$ and in a plane above the same, and the parts and frames of the device are so arranged as to permit an extended independent vertical movement of the tooth-carrying frame with relation to the draft-frame and preferably so as to prevent independent lateral play of the tooth-frame with respect to the draft-frame.

Various arrangements and constructions can be employed in coupling or connecting the tooth-frame to the draft-frame, and it is not essential that when the tooth-frame is made up of tooth-bars such bars be rigidly secured together or that the tooth-frame be in one rigid frame, as the same might be and can be formed in independently-movable sections.

In the specific example shown the means employed to couple the tooth-frame to the draft-frame consist of rigid draft bars or connections $f f$, at their rear ends rigid with the tooth-frame and from thence extending upwardly and forwardly over the draft-frame and at their front ends pivoted to the draft-frame at an intermediate point or points in its length and at a distance in advance of its rear end or axle $b$. It is usually advantageous to locate this pivotal point as far in advance of the axle $b$ as practicable, as thereby a greater vertical movement of the tooth-frame is attained with a minimum horizontal or fore-and-aft movement. The bars $f f$ are here shown extending transversely of and secured to the various tooth-bars and widely separated from each other, usually about in the vertical planes of the shaft or thills $a\ a$, respectively, and from the tooth-bars the bars $f f$ extend forwardly a distance above the axle $b$ and thills $a\ a$ and at the proper intermediate point have their ends extended downwardly, so as to pass down at the outer faces, respectively, of said thills. The ends of the draft bars or connections are pivotally jointed to the thills by the pivot-bolts $f'\ f'$, which hold said bars against independent lateral play and yet permit free vertical movement of the draft-bars and tooth-frame on said bolts or pivots as centers. The draft-bars can be formed with about straight vertical portions formed with vertical series of bolt-holes, as shown in Fig. 3, so that the bolts $f'$ can be removed and placed in different holes, thereby adjusting the draft-bars vertically with respect to the draft-frame and varying the working depth and vertical movement of the tooth-frame or to level the tooth-gang with respect to the wheeled supporting attachment. Of course it is obvious that my invention is not thus limited to the form of the draft connections and vertical adjustment specified. The coupling or draft connection is preferably rigid with the intermediate central portion of the wide transversely-arranged gang and extends forwardly therefrom, and in the specific example shown said coupling-bars $f f$ are rigid.

If so desired, springs can be employed exerting a constant lifting or upward pressure on the tooth-frame, and said springs are interposed between the draft-frame and the tooth-frame and in a measure balance the draft-frame, so that it will readily respond to the upward pressure or lift of the operator, avoiding the necessity of lifting the entire weight of the tooth-frame, and so that the tooth-frame is forced down to work against the pressure of such spring or springs. Such spring or springs can be variously arranged, if employed, and in Fig. 3 I show plate-springs $g$, secured to the draft-frame or wheeled supporting attachment at any desired location, usually to the thills thereof, with their free ends pressing up against the draft bars or connections $f f$.

It is preferable that means be employed whereby the tooth-frame can be held in an elevated position, with its teeth clear of the ground and its entire weight thrown onto the wheeled support, so that the implement can be easily transported on the wheels with the teeth clear. Various means can be provided for this purpose, and as a specific example I show the draft-frame or wheeled support, usually the axle $b$ thereof, provided with a centrally-arranged upwardly-extending rod or arm $h$, with its upper end extended rearwardly and provided with a hook or catch to receive a chain $h'$ or other connection secured centrally to the tooth-frame, so that the tooth-frame can be elevated and the chain caught on the hook and the tooth-frame thus held in the desired elevated position. When the parts are in working position, with the teeth in operative engagement with the soil, the chain can hang loose detached from said hook or its upper end can be located on the hook, so that ample slack will be left to permit the proper vertical play of the tooth-frame.

$i$ is a whiffletree secured to the draft-frame, usually to the axle $b$ thereof.

The supporting-wheels or other devices are preferably arranged in rear of the draft-frame, so as to be located about at the center of gravity, whereby the tooth-frame will approximately balance with the draft-frame and its forwardly-extending coupling or draft connections, and it should also be noted that rocking tooth-bars might be employed with connecting-bar and lever, so that the pitch of the teeth could be changed.

The implement can be employed as a straddle-row cultivator or harrow by removing the center teeth of the gang and, if necessary, some of the end teeth, so that the teeth will run between the rows. Also the ground-supports can be adjusted laterally of the axle, (see Fig. 2,) if necessary, to run between the rows. The implement can be easily guided laterally to follow the rows whether or not the gang has an independent lateral play, as the caster-wheels will quickly carry the entire implement laterally under the influence of guiding pressure on the handles.

The device can be employed as an ordinary weeder or other soil stirring or pulverizing implement, as is obvious, and can be made to cut a wide stretch by reason of the construction of the device. Usually they are made to cut or work a stretch about six to eight feet wide, although I prefer to make the gangs six feet wide as a standard width.

By employing the wide gang and very long drag-bar the gang is easily kept level and horizontal, with the teeth working an approximately even depth, and the teeth are held down into the soil, working their full depth without requiring constant pressure on the part of the operator and without jumping in hard soil.

Among other features of my invention I desire to direct attention to the advantageous and new results attained by locating the point of coupling or connection between the gang or tooth frame and a wheeled or other supporting-frame at an advance point a distance forward of the gang and wheeled support or the axle and wheels thereof, irrespective of the relative position between the supporting-frame and the gang or of the relative sizes and location thereof. It should also be noted that material advantages and new results are attained by providing means whereby the working depth of the teeth can be controlled through the medium of supporting or stop mechanism between a supporting-frame and the gang and also whereby the gang can be held elevated with its teeth clear of the soil. These advantages accrue whether or not the gang is provided with handles, and my invention is not limited to the employment of the handles.

It should be noted that in the specific example illustrated the tooth-gang is coupled to the supporting attachment by the removable horizontal pivot or coupling bolts $f' f'$. Hence several interchangeable tooth-gangs having different styles of teeth can be used alternately on the same supporting attachment by providing each gang with the long coupling bars or shafts $f f$ and by merely removing and replacing said two coupling-bolts.

A farm implement of wide and extensive adaptability is thus provided, which dispenses with the necessity of providing a number of separately complete tools, as has been heretofore generally necessary.

To those skilled in the art the many material advantages attained by having the long drag-bar with an extensive free upward swing and arranged above the plane of the draft tongue or connections and the straight line of the axle will be at once understood and clearly obvious. Among other advantages attained in my device over ordinary drag-bar cultivators, outside of the advantage of attaining a long drag-bar and free extensive upward swing, is the fact that I am enabled to raise my gang so as to employ long teeth—say about thirty inches long in the vertical line—thereby avoiding trouble with trash and enabling the implement to work all ordinary crops.

It is evident that various changes might be made in the forms, constructions, and arrangements of the parts described without departing from the spirit and scope of my invention. Hence I do not wish to limit myself to the forms and constructions shown and specifically described, but consider myself entitled to all such changes as fall within the spirit and scope of my invention.

Having thus fully described my invention, what I claim as new, and desire to secure by Letters Patent of the United States, is—

1. An implement of the character described, having a supporting-frame provided with rear ground-supports, and a wide tooth-gang in rear of said frame provided with a drag-bar draft connection rigid therewith and extending forwardly above said frame and pivotally coupled thereto in advance of its rear end, whereby a long drag-bar connection is attained and the gang is maintained approximately level, substantially as described.

2. An agricultural implement comprising the combination of a supporting-frame having ground-supports and a rigid forwardly-extending draft connection, in combination with a gang comprising transversely-arranged tooth-bars carrying teeth in rear of the supporting-frame and provided with a drag-bar rigid therewith and extending forwardly of the supporting-frame and at its front end pivotally coupled to said rigid draft connection at an advanced point to permit free vertical play of the gang independently of the supporting-frame, substantially as described.

3. A weeder provided with a wheeled frame, and drag-bars rigid with the weeder and extending forwardly of and pivotally joined at separated points to advanced portions of the wheeled frame, substantially as described.

4. A supporting-frame having laterally-adjustable supporting-wheels, whereby the wheels can be moved laterally to run between rows of plants of various widths, in combination with a wide transversely-arranged tooth-gang loosely coupled to an advanced portion of said draft-frame, permitting free vertical play of the gang, substantially as described.

5. In combination, a wide transversely-arranged tooth-gang provided with forwardly-extending draft connections rigid therewith, a wheeled support comprising forwardly-extending draft connections, said connections arranged one approximately above the other and pivotally joined in advance of the gang, substantially as described.

6. In combination, a wide transversely-arranged tooth-gang, having a forwardly-extending draft device rigid therewith, a wheeled supporting-frame having a forwardly-extending draft device, and removable mechanism pivotally coupling said draft devices together, whereby different gangs each having draft devices can be interchangeably used on the same supporting-frame, substantially as described.

7. In combination, a wheeled supporting-frame, comprising forwardly-extending shafts and ground-supports at the rear thereof, and a wide transversely-arranged tooth-gang having bars secured to the intermediate central portion thereof and extended forwardly and pivotally coupled to said shafts whereby the gang has an independent vertical swing and a long drag-bar connection, substantially as described.

8. A wheeled supporting-frame having an upright hook-support at its rear portion, in combination with a vertically-movable tooth-gang frame having a long drag-bar connection with said supporting-frame, and a loose connection secured to the gang-frame and confined to said support, whereby the gang-frame can be held elevated thereby, substantially as described.

9. In an agricultural implement, the combination of a supporting-frame having a cross-bar, a tooth-gang having a drag-bar connection with said frame, wheel-frames extending downwardly and rearwardly from said cross-bar, and securing means on said bar for said wheel-frames arranged to receive the wheel-frames at different distances apart, whereby the wheel-frames are adjustable longitudinally of the cross-bar for the purposes substantially as stated.

10. In an agricultural implement, the combination of a wheeled supporting-frame, and a transversely-arranged tooth-gang having a long drag-bar connection with an advanced portion of said supporting-frame, whereby the tooth-gang is maintained approximately level in action, substantially as described.

11. In an agricultural implement, the combination of a wheeled supporting-frame, a transversely-arranged tooth-gang having a long drag-bar connection with and extending above said supporting-frame, and a counterbalancing spring device carried by said frame and exerting upward tension on said gang, substantially as described.

12. A supporting-frame having rear wheeled supports and forwardly-extending rigid draft connections, in combination with a vertically-movable tooth-gang in rear of said frame and provided with a drag-bar coupled with an advanced portion of said frame, and a plate-spring secured to said frame and exerting upward tension on said gang to counterbalance the weight thereof, substantially as described.

13. In an agricultural implement, the combination of a wheeled support, a wide transversely-arranged tooth-gang frame having a drag-bar secured rigidly thereto and loosely coupled with the wheeled support, and a plate-spring secured to the wheeled support with its free end beneath and pressing upwardly on said drag-bar, substantially as described.

14. In an agricultural implement, the combination of a wheeled support, a wide transversely-arranged tooth-gang, a long drag-bar connection between the tooth-gang and wheeled support comprising a rigid drag-bar rigidly secured to the tooth-gang, and a spring balancing device from the wheeled support acting on said gang through the medium of said drag-bar, substantially as described.

15. The implement comprising the tooth-gang vertically movable bodily and comprising several connected tooth-bars, rigid draft devices therefor to which said tooth-gang is loosely coupled, caster-wheel supports at intermediate portions of the implement and on which the same approximately balances, counterbalancing spring devices for the tooth-gang, and means to hold the same with its teeth from the ground, substantially as described.

16. A cross-beam having a forwardly-extending draft device rigid therewith and depending rearwardly-extending caster-wheel frames upholding said beam and provided with small ground-wheels in rear of the vertical plane of said beam, in combination with a transversely-arranged tooth-gang in rear of said beam and comprising several connected tooth-bars, said gang vertically movable independently of said beam and provided with a long drag-bar connection with said draft device, substantially as described.

17. A supporting-frame having caster-wheel ground-supports at its rear in combination with a transversely-arranged tooth-gang made up of several connected tooth-bars having a long drag-bar connection with said frame and adjustable coupling means whereby said long drag-bar connection can be adjusted vertically with respect to said supporting-frame, substantially as described.

18. A supporting-frame having caster-wheel frames extending downwardly and rearwardly from the rear portion thereof and provided with small supporting-wheels in a vertical plane in rear of the supporting-frame, in combination with a vertically-movable wide transversely-arranged tooth-gang in rear of the supporting-frame and made up of several connected tooth-bars, said tooth-gang having drag-bar connection with said frame and movable vertically independently thereof, said gang and frame approximately counterbalancing each other on said wheels, substantially as described.

19. A wide transversely-arranged tooth-gang having long soil-stirring teeth and forwardly-extending draft and supporting means, in combination with a wheeled supporting-frame comprising forwardly-extending draft and supporting means, said means pivotally coupled together at advanced portions in advance of the gang and rear portion of said frame, and arranged one above the other and one of them extended forwardly from said coupling, substantially as described.

20. In combination, a wheeled supporting-frame, having its ground-supports at the rear, a transversely-arranged tooth-gang frame movable vertically independently of the supporting-frame and having a forwardly-extending coupling device pivotally joined to the supporting-frame in advance of its rear end and at an intermediate point thereof, said supporting-frame provided with an upright and a connection from the tooth-gang frame to the upright whereby the tooth-gang frame can be held in an elevated position with its teeth clear of the soil and carried by the wheeled supporting-frame, substantially as described.

21. A rigid supporting-frame having rearwardly-extending laterally-movable wheel-frames provided with supporting-wheels in combination with a wide transversely-arranged tooth-gang of several connected tooth-bars, said gang having a long drag-bar connection with and above said supporting-frame and bodily movable vertically independently thereof and held against lateral play independently thereof.

22. A forwardly-extending supporting-frame having supporting-wheels at its rear, in combination with a wide transversely-arranged tooth-gang in a different horizontal plane from the frame and having forwardly-extending draft connections in a different horizontal plane from the supporting-frame and coupled thereto at a point in advance of the gang and rear end of the supporting-frame, substantially as described.

23. In combination, a supporting-frame having loose rearwardly-extending caster-wheel frames having ground-wheels, a wide transversely-arranged tooth-gang connected therewith, the implement approximately balancing on said wheels, said supporting-frame and said tooth-gang having parts rigid therewith, respectively, and arranged one above the other, and a spring mechanism between said parts exerting constant upward pressure on said gang to lift and balance the same on said wheels and thereby throw the weight thereof on the wheels for transportation, substantially as described.

24. In combination, a wheeled supporting-frame, a wide transversely-arranged vertically-movable tooth-gang having drag-bar connection therewith and made up of several connected tooth-bars, a spring mechanism exerting constant lifting pressure on the gang, and a stop mechanism independent of said spring mechanism, whereby the gang can be held elevated and carried by said frame for transportation, substantially as described.

25. A supporting-frame comprising a rigid forwardly-extending portion and at its rear provided with downwardly and rearwardly extending freely laterally movable caster-wheel frames at their rear ends provided with ground-wheels, in combination with a wide transversely-arranged tooth-gang having drag-bar connection with and above said frame, said gang movable vertically and held against lateral movement independently of said frame and comprising several connected tooth-bars, said wheels arranged at the central front portion of the gang, substantially as described.

26. In an agricultural implement, the combination of a wheeled supporting-frame, comprising a forwardly-extending rigid portion, a wide transversely-arranged vertically-movable tooth-gang made up of several connected tooth-bars carrying teeth said gang coupled with said frame and swinging vertically and receiving its draft from an intermediate portion in the length of said forwardly-extending portion of the frame and in advance of the gang and rear of the frame, whereby the gang is maintained approximately level, substantially as described.

27. In combination, a wheeled supporting-frame, a tooth-gang in rear thereof, a long drag-bar connection between the tooth-gang and said supporting-frame, and adjustable coupling mechanism, whereby the tooth-gang can be leveled with respect to the wheeled supporting-frame, substantially as described.

28. In combination, a supporting-frame having supporting-wheels at its rear portion, a vertically-movable tooth-gang having a long drag-bar connection with said frame in advance of its rear portion and the gang, and supporting mechanism, whereby the gang can be held elevated with its teeth clear of the soil and its weight thrown on the supporting-frame, substantially as described.

29. In combination, a wheeled cross-frame having a rigid forwardly-extending draft-shaft, a vertically-movable rear tooth-gang, and a rigid drag-bar secured to the gang and extended forwardly and pivotally joined to said shaft between its ends, substantially as described.

In testimony whereof I affix my signature in presence of two witnesses.

EFFINGER E. WHIPPLE.

Witnesses:
 MAUD WHIPPLE,
 HANNAH M. WHIPPLE.